United States Patent [19]
Barham et al.

[11] Patent Number: 5,432,813
[45] Date of Patent: Jul. 11, 1995

[54] PARALLEL PROCESSING BASED DIGITAL MATCHED FILTER AND ERROR DETECTOR FOR A DIGITAL DEMODULATOR

[75] Inventors: Steven T. Barham; Samuel C. Kingston, both of Salt Lake City; Harold L. Simonson, South Jordan, all of Utah

[73] Assignee: Unisys Corporation, Blue Bell, Pa.

[21] Appl. No.: 179,637

[22] Filed: Dec. 28, 1993

[51] Int. Cl.[6] .............................................. H04K 1/00
[52] U.S. Cl. ...................................... 375/207; 380/34
[58] Field of Search ................................ 375/1; 380/34

[56] References Cited

U.S. PATENT DOCUMENTS

| | | | |
|---|---|---|---|
| 4,841,522 | 6/1989 | Yamazaki | 375/1 X |
| 5,099,494 | 3/1992 | Kingston et al. | 375/1 |
| 5,216,691 | 6/1993 | Kaufmann | 375/1 |
| 5,253,268 | 10/1993 | Omura et al. | 375/1 |
| 5,293,398 | 3/1994 | Hamao et al. | 375/1 |

Primary Examiner—Tod R. Swann
Attorney, Agent, or Firm—John B. Sowell; Mark T. Starr

[57] ABSTRACT

A high chipping rate digital demodulator circuit is coupled to the output of an analog front end communications receiver and comprises a low pass filter in each channel of the receiver. The filtered output is coupled to a plurality of parallel branches each having an analog to digital converter which converts a portion of an analog sample to digital format and effectively reduces the system clock rate by a ratio of the number of parallel branches. One set of parallel branches is coupled to an early-late clock error detector circuits and another set of parallel branches is coupled to data signal detector circuits and then combined before being applied to a clock error processing channel and a data signal phase error channel which maintains the lower clock rate of the parallel branches.

14 Claims, 7 Drawing Sheets

PARALLEL PROCESSING BASED DIGITAL MATCHED FILTER AND ERROR DETECTOR FOR A DIGITAL DEMODULATOR

BACKGROUND OF THE INVENTION

1. Field of the Invention

The present invention relates to digital components employed in an improved high speed digital demodulator. More particularly, the present invention relates to a novel digital matched filter and novel error detector useful to increase the operational speed of a digital demodulator.

2. Description of the Prior Art

Heretofore, digital demodulators were known. Our U.S. Pat. No. 5,099,494 shows and describes a Six Channel Digital Demodulator that has been reduced to practice on a single semiconductor chip. This chip incorporates our Digital Phase Shifter shown in our U.S. Pat. No. 4,841,522 and our Variable Rate Rectangular Matched Filter shown in our U.S. Pat. No. 4,808,939.

This prior art digital demodulator and other prior art direct sequence spread spectrum (DSSS) systems that employ digital signal processing require that the chipping rate be equal to, or less than the system clock rate of the digital circuitry. The maximum digital system clock rate is limited by the maximum operational speed of the digital components in the system, which in turn are limited by the complexity of the components and the type of semiconductor devices which limits their logic speed.

It would be desirable to provide a novel digital demodulator whose fundamental signal processing rate does not limit the chipping rate to the digital systems' clock rate.

SUMMARY OF THE INVENTION

It is a primary object of the present invention to provide a novel high speed digital demodulator.

It is a primary object of the present invention to provide novel parallel processing components for a high speed digital demodulator.

It is a primary object of the present invention to provide novel parallel components for a digital demodulator that allows the digital circuitry components to operate at substantially lower rates than the chipping rate of the incoming spread spectrum signals.

It is a primary object of the present invention to provide a DSSS demodulator with an effective clock rate that exceeds the digital receiver chipping clock rate.

It is a general object of the present invention to provide a higher chipping rate digital demodulator which achieves higher processing gain which results in higher jamming resistance.

According to these and other objects of the present invention, there is provided a novel digital demodulator having an N parallel stage analog to digital converter wherein each parallel stage is operable at a frequency of the chipping rate divided by the number of stages N. Each stage output of the analog to digital converter is passed through a finite impulse response (FIR) filter before being applied to novel parallel detector circuits which recombine the parallel stages to produce a real (I) channel signal and an imaginary (Q) channel signal which can be further processed to produce the carrier clock error signal and a data signal at the lower frequency of the parallel stages.

Figure 1:
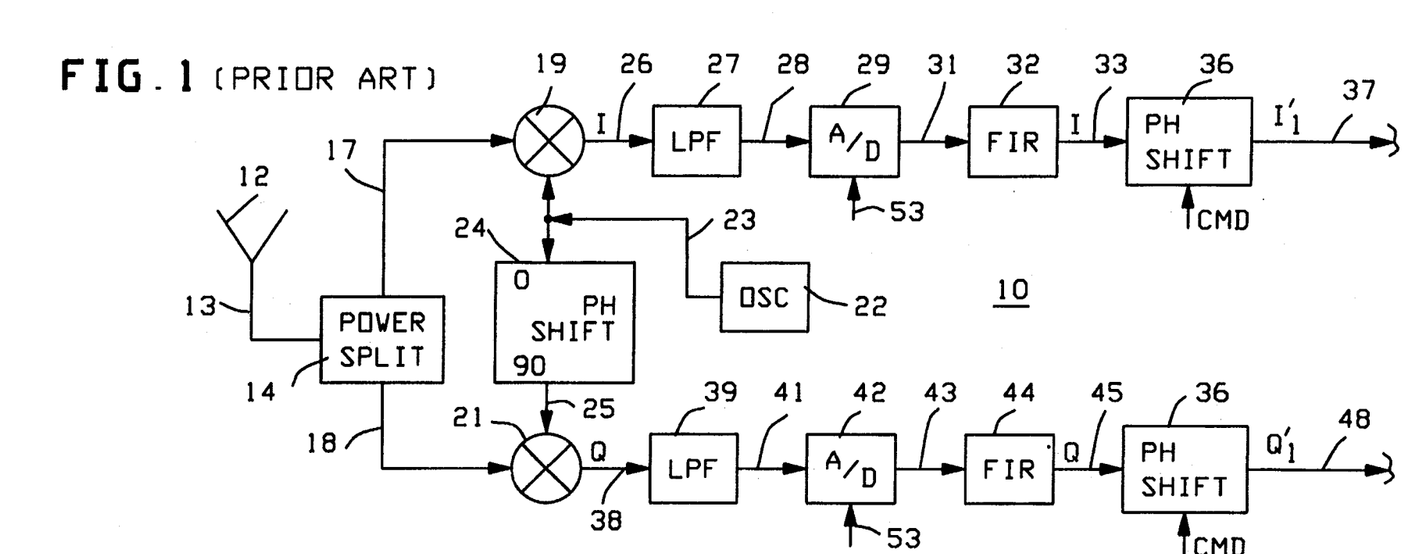
FIG. 1 is a schematic block diagram of a prior art communication pre-processing circuit.

Refer now to FIG. 1 showing a block diagram of a communications receiver pre-processing circuit of the type shown and described in our U.S. Pat. No. 5,099,494 for a Six Channel Demodulator. PN coded radio frequency signals are received by antenna 12 and produce analog signals on line 13 which are amplified and applied to a power splitter 16 to produce RF analog quadrature signals on lines 17 and 18. The signals on lines 17 and 18 are applied to a pair of mixers 19 and 31 having outputs connected to the inputs of the real (I) and imaginary (Q) channels at lines 26 and 38. The RF signals on lines 17 and 18 are applied to mixers 19 and 21 along with the output of a fixed frequency oscillator 22 on line 23 and a 90° phase shifted signal on line 25 from phase shifter 24. The analog RF signals on line 26 and 38 are applied to the inputs of low pass filters 27 and 39 respectively. The outputs on lines 28 and 41 are applied to the inputs of analog to digital converters 29 and 42 shown having a systems clock input on line 53. The output of converters 29 and 42 on lines 31 and 43 are applied to finite infinite response (FIR) filters 32 and 44 to provide simulated matched filter outputs on lines 33 and 45, which are applied as inputs on line 35 and 47 to a two input phase shifter 36 to produce real channel (I') and imaginary channel (Q') outputs on lines 37 and 48. A more detailed description of receiver 10 is provided in our U.S. Pat. No. 5,099,494 which is incorporated herein by reference.

Figure 2:
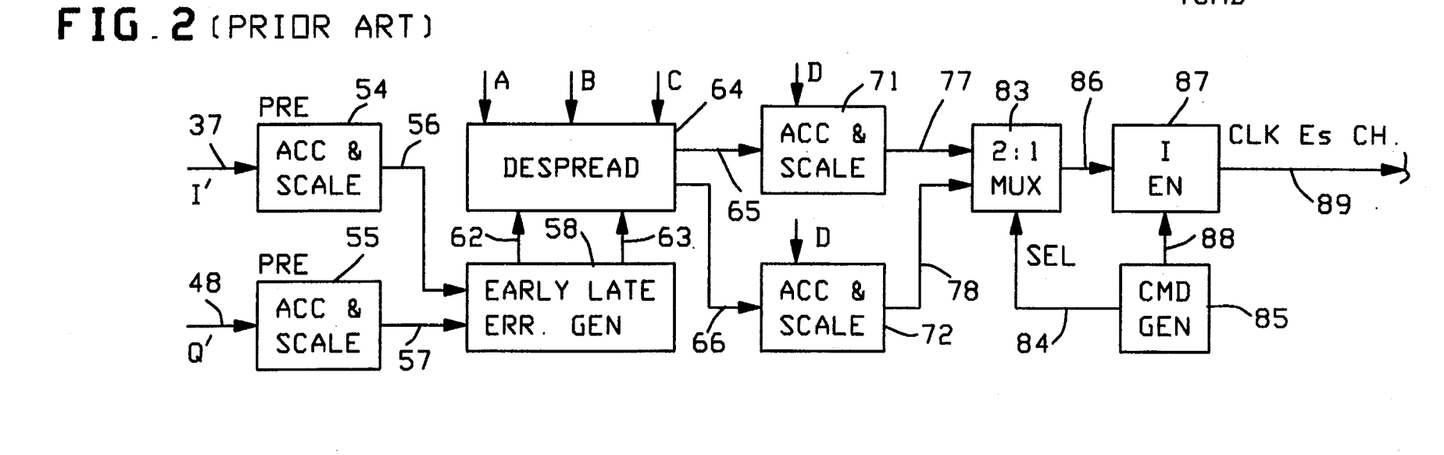
FIG. 2 is a schematic block diagram of a prior art clock recovery channel of a prior art demodulator.

Refer now to FIG. 2 showing a block diagram of a prior art clock recovery channel of the type shown and described in detail in our U.S. Pat. No. 5,099,494 and adapted to receive as inputs the signals on lines 37 and 48 shown in FIG. 1. The data on lines 37 and 48 may be applied to optional pre-accumulate and scale circuits 54 and 55 to produce output signals on lines 56 and 57, which are applied to the early-late error signal generator 58. The generator outputs on lines 62 and 63 are applied as inputs to despreader 64. Despreader 64 is shown having inputs A, B, and C which are coupled to the real (I) PN replica generated signal, the imaginary (Q) PN replica signal and a command input from a remote programmable microprocessor respectively. The processed output on line 65 and 66 are applied to accumulate and scale circuits 71 and 72 shown having an enable input D and a "bit" date rate input E employed as a symbol strobe.

The I and Q outputs from circuits 71 and 72 on lines 77 and 78 are applied to a multiplexer 83 which is controlled by a channel selection signal on line 84 from a command generator 85. The output of multiplexer 83 on line 86 is applied to a decision directed invertor 87 having a command enable input on line 88 which enables the clock error signal ($E_s$) output on line 89. The clock error signal ($E_s$) is filtered and applied to a clock synthesizer (not shown) to produce the system clocks, the sampling clock and the strobe signals used in the demodulator. The production of these signals is explained in detail in our U.S. Pat. No. 5,105,437 entitled Programmable Digital Acquisition and Tracking Controller and need not be explained in detail for purposes of the present invention.

Figure 3:
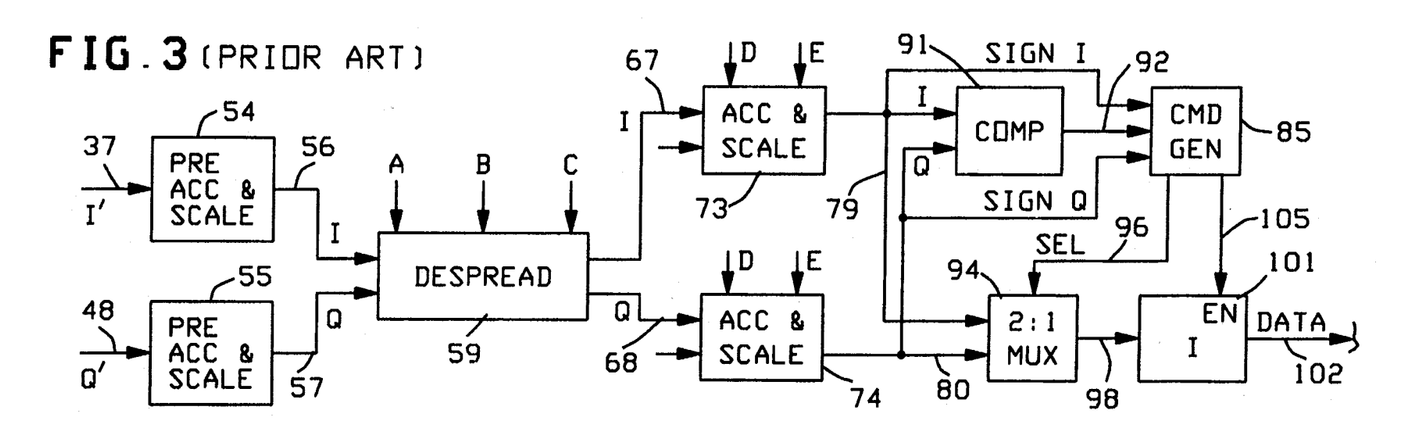
FIG. 3 is a schematic block diagram of a prior art data recovery channel of a prior art demodulator.

Refer now to FIG. 3 showing a block diagram of a prior art data detection circuit of the type shown and described in detail in our U.S. Pat. No. 5,099,494 which is adapted to receive the real (I′) and imaginary (Q′) signals as inputs from the signals on lines 37 and 48 shown in FIG. 1. The data on lines 37 and 48 is applied to the optional pre-accumulate and scale circuits 54 and 55 to produce output signals on lines 56 and 57. The output signals on lines 56 and 57 are applied to the input of despreader 59 shown having inputs A, B, and C which are respectively coupled to the real (I) PN replica code, the imaginary (Q) PN replica code and to a command input from a remote microprocessor.

The I and Q signals on lines 67 and 68 from despreader 59 are applied to individual accumulate and scale circuits 73 and 74 to produce I and Q outputs on lines 79 and 80. Circuits 73 and 74 are shown having an enable input (D) and a data rate strobe input (E).

The I and Q signals on lines 79 and 80 are applied to a comparator 91 to produce a high output signal on line 92 when the magnitude of the Q signal is higher than the magnitude of the I signal. The sign bit from the data on lines 79 and 80 is also applied directly to the command generator 85 and is indicative of the hard decision sign of the I and Q data in the I and Q channels. The command generator 85 is capable of controlling multiplexer 94 via a selection signal on line 96 to produce any one of the two I and Q inputs. Four I and Q inputs may be employed for the output on line 98. The selection of one of two (up to four) inputs may be predicted upon whether Q is larger than I or upon which channel has data available. Four I and Q channels are preferably employed for recovering binary phase shift key (BPSK) data. The inputs to multiplexer 94 are processed to produce an output signal on line 98 which is applied to a decision director invertor 101 to produce an output signal or signal level which is indicative of the data being received. The data is preferably recovered in an accumulate and scale circuit of the type shown and described in our U.S. Pat. No. 5,128,958 entitled Digital Time Error Signal Generator, incorporated by referenced herein, and need not be explained in detail for the purpose of the present invention.

Figure 4:
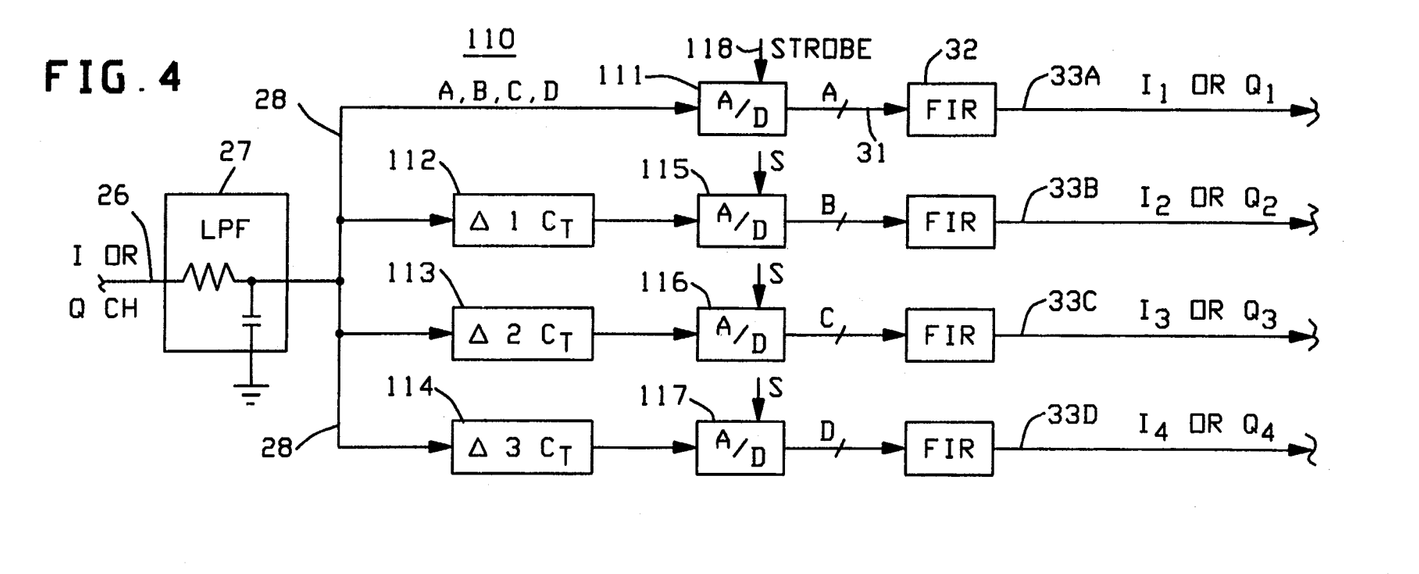
FIG. 4 is a schematic block diagram of one preferred embodiment novel series to parallel analog to digital converter.

Refer now to FIG. 4 showing a schematic block diagram of a preferred embodiment series to parallel analog to digital converter 110. For purposes of the present invention, the real (I) channel of FIG. 1 will be explained as providing the serial input on line 26. A similar parallel output converter will be required for the imaginary (Q) channel and each converter will be provided with N stages where the number of stages is selected or determined by the minimum required to reduce the operational rate of the components in the stages to a rate compatible with the type of components used in the parallel stages. Thus, if the high speed chipping rate on line 26 is at $R_c$ the frequency or rate of the stages to be explained is equal to $R_c$ divided by N where N is the number of stages in the series to parallel converter 110 that replaces the A to D converter 29 in FIG. 1. Assume that chips A, B, C, and D etc. are designations for chips being presented in the signal stream on line 28. The signal in stage A is not delayed but is directly jammed into buffer 111. Stages B to D shown at lines 31 have the signals delayed by one chip times ($\Delta C_i$) to three chip times ($3\Delta C_i$) shown at delays 112 to 114 before being stored buffers 115 to 117. When the chip D is stored in buffer 117, the chip A is stored in buffer 111. Thus if buffers 111 to 117 are strobed simultaneously, the eight bit digital data will be outputted simultaneously on lines 31 for the stages A to D in reverse order of sequence as will be explained hereinafter. To maintain continuity between figures, the outputs on lines 31 are shown being applied to filters 32 to produce the desired 8 bit parallel digital signals on each of lines 31A to 31D indicative of four consecutive chips. At the eighth chip time when chip H is in buffer 117, the strobe at 118 will cause the parallel output of digital eight bit information representatives of chip E to H and so forth.

Figure 5:
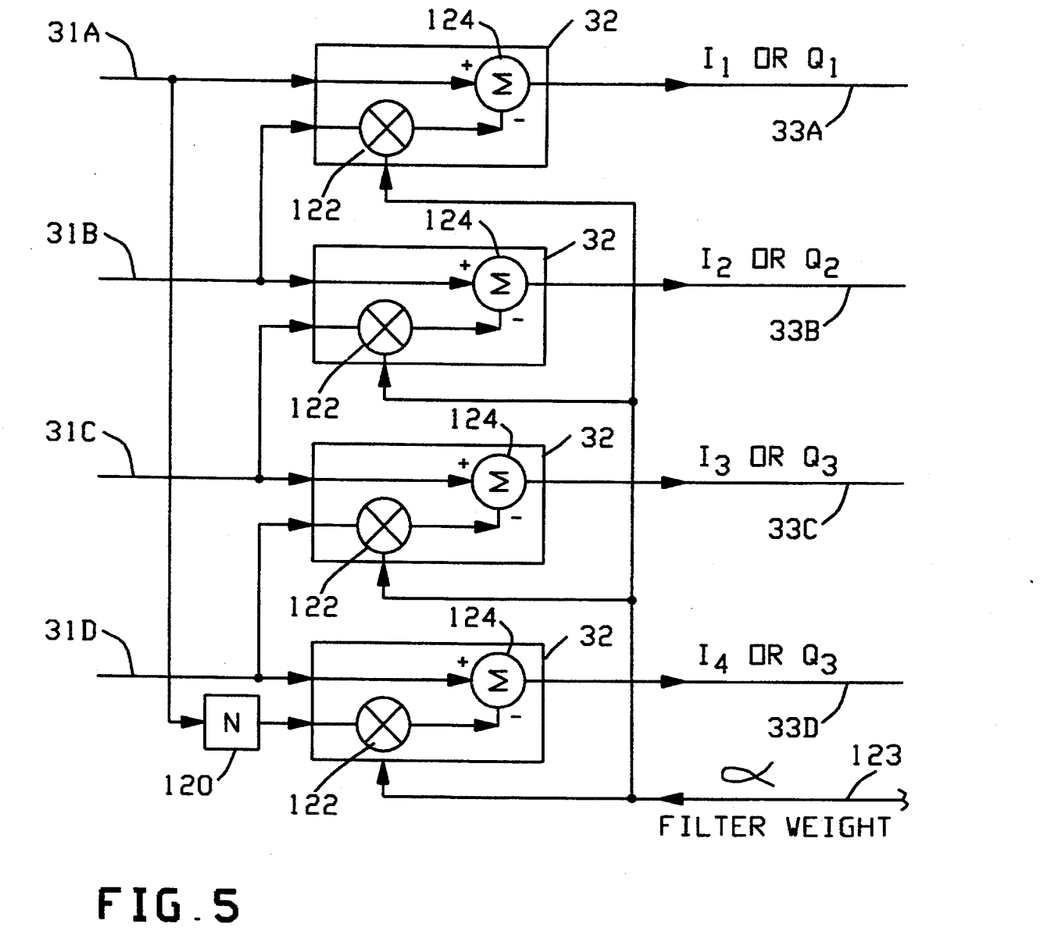
FIG. 5 is a schematic block diagram of a preferred embodiment novel parallel finite impulse response (FIR) filter.

Refer now to FIG. 5 showing a schematic block diagram of a preferred embodiment parallel finite impulse response (FIR) filter 121 which replaces the filter 32 shown in FIG. 1. The input lines 31A to 31D are shown as the outputs from the A to D circuit 111 and 115 to 117 shown in FIG. 4. It should be understood that N stages A to D in FIGS. 4 and 5 are representative of one I or one Q channel and each channel could comprise as many (N) stages for each of the I and Q channels as needed to increase the system chipping rate.

Each of the parallel stages or branches 31A to 31D comprise a FIR filter 32. Each FIR filter comprises a multiplier 122 shown having two inputs, one from the next sequential stage and an alpha ($\alpha$) input on line 123 which comprise a digital weight determined by the elements in the filter 32. An N chip delay 120 is placed in series in the input line 31A to multiplier 122. The output of multiplier 122 is coupled to the negative input of an adder or summing circuit 124 shown having another input 31A to 31D at the respective stage A to D. The summed outputs on lines 33A to 33D are the parallel outputs corresponding to the outputs shown in FIG. 1 and 4. The FIR filters 32 in FIG. 5 are the same as the filter 32 shown in FIG. 4. The numerals used on the output lines correspond to those used on input lines throughout the demodulator.

Figure 6:
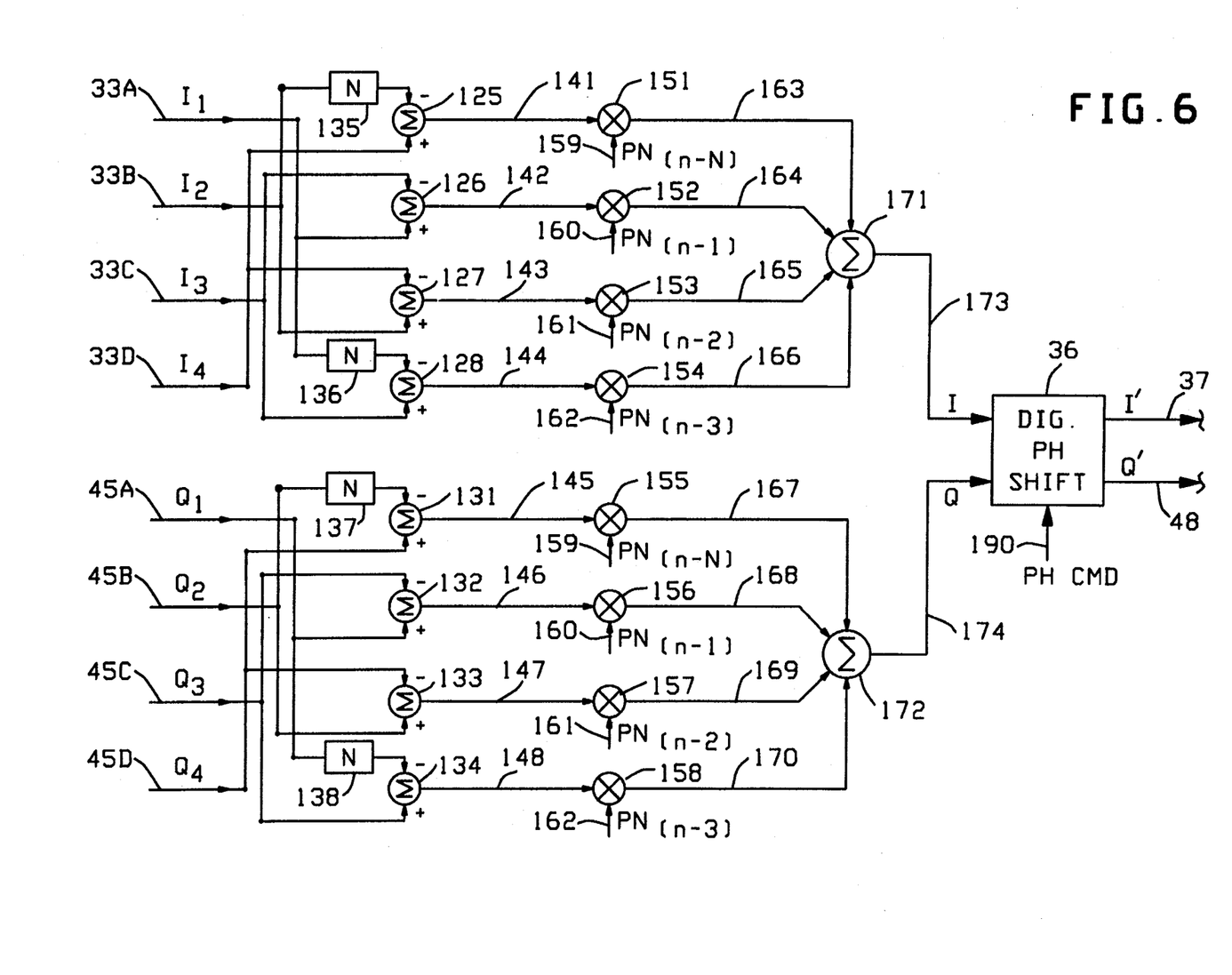
FIG. 6 is a schematic block diagram of a preferred embodiment novel parallel to series, early-late error signal detector.

Refer now to FIG. 6 showing a preferred embodiment parallel to series early-late error signal detector used in the clock recovery channel shown in FIG. 2. The outputs 33A to 33D from FIR filter 32 are shown as inputs to a plurality of summing circuits 125 to 128. The outputs from FIR filter 44 in FIG. 1 are shown on line 45. To keep the related numbers between figures consistent, the imaginary (Q) lines in FIG. 6 are numbered 45A to 45D, which are shown as inputs to summing circuits 131 to 134. The inputs to the negative side of summing circuits 125, 128, 131, and 134 are shown having a N chip delay circuit 135 to 138 in series with their respective I and Q inputs. Each summing circuit, like circuit 127 at line I3, receives an early input (i.e., I2) at its positive side and a late input (i.e., I4) at its negative side to provide an early-late error signal to the detector having outputs on lines 141 to 148, which provides the inputs to mixers 151 to 158 respectively. Each of the mixers 151 to 154 in the I stages is provided with a unique PN generated replica code on lines 159 to 162 derived from a full PN replica code. As will be explained hereinafter, the four unique replica codes were shifted in time from each other by one chip time $\Delta T_c$, then buffered to provide simultaneous output to enable the recovery of the information on lines 141 to 148. The partial PN codes on output lines 163 to 170 act as strobes to effect simultaneous inputs to summing circuits 171 and 172 that reproduce the desired I and Q outputs on lines 173 and 174 which are not phase shifted. In the FIG. 6 preferred embodiment of the present invention, a two input digital phase shifter 36 is employed after parallel processing in the demodulator/detector shown in FIG. 6. A single phase shifter 36 of the type shown in FIG. 1 is capable of controlling the single high speed phase shifted output on lines 37 and 48. Had the phase shifting operation been performed in the parallel branches of FIGS. 4 to 6, it but would require as many phase shifters as there are branches, thus is not a preferred mode of operation.

Figure 7:
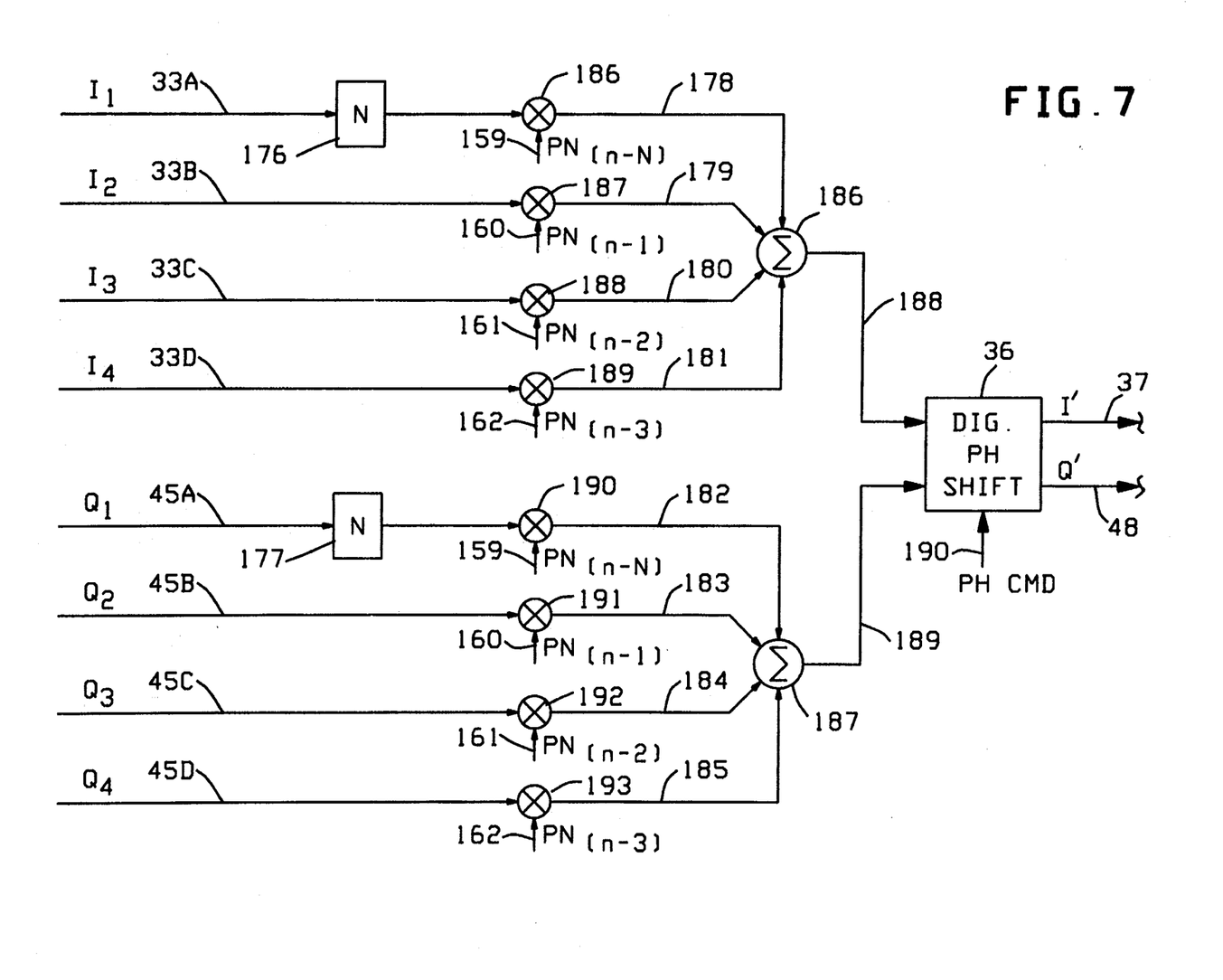
FIG. 7 is a schematic block diagram of a preferred embodiment novel parallel to series data signal detector.

Refer now to FIG. 7 showing a preferred embodiment parallel to series data signal detector used in the demodulator of the data recovery channel. The same inputs shown and described in FIG. 6 are the inputs shown in FIG. 7 and comprise the outputs from the parallel FIR 121 shown in FIG. 5.

The data on lines 33A to 33D and 45A to 45D is effectively separated in time divisions or dominans when converted from serial to parallel format as shown in FIG. 4. One symbol time delays 176 and 177 are connected in series in lines 33A ($I_1$) and 45A ($Q_1$) to synchronize the outputs on lines 178 to 185 from mixers 186 to 193. The previously described four unique PN generated replica codes that were shifted one from the other by one chip time $\Delta T_c$ are shown at lines 159 to 162 being applied simultaneously to provide the outputs on lines 178 to 185 to four input summing circuits 186 and 187 to produce combined serial digital data on lines 188 and 189. A second two input digital phase shifter 36 is coupled to the outputs 188 and 189 of summing circuits 186 and 187 to provide the desired phase shifted and combined high speed data on lines 37 (I') and 42 (Q'). The same phase command on line 190 as employed in FIG. 6 is employed to control the second digital phase shifter 36.

Figure 8:
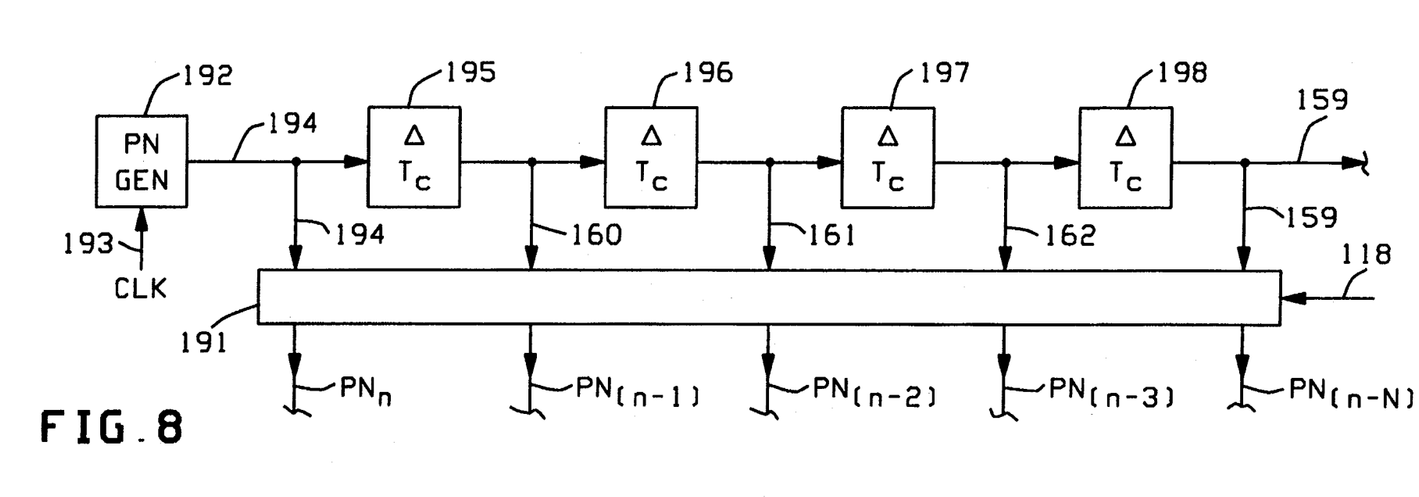
FIG. 8 is a schematic block diagram of a preferred embodiment novel PN generator.

Refer now to FIG. 8 showing a preferred embodiment novel PN generator employed to generate a plurality of unique replica codes separated in time one form the other by one chip time $T_c$.

The system PN generator 192 is synchronized by the system clock on line 193 to produce the master replica code on line 194. The master replica code on line 194 is applied through a series of one chip delays 195 to 198 to produce unique replica codes on lines 160 to 162 and 159 that are delayed from the master replica code on line 194 by one to four chip times respectively. These unique replica codes on lines 159 to 162 are stored in a buffer 191 and strobed out simultaneously by a strobe on line 118 and employed as inputs to the mixers shown in FIGS. 6 and 7. It will be understood that the unique replica codes employed in the preferred embodiment may be generated by other means such as phase generators and conventional shift registers even though they would be more expensive than the generator shown.

Figure 9:
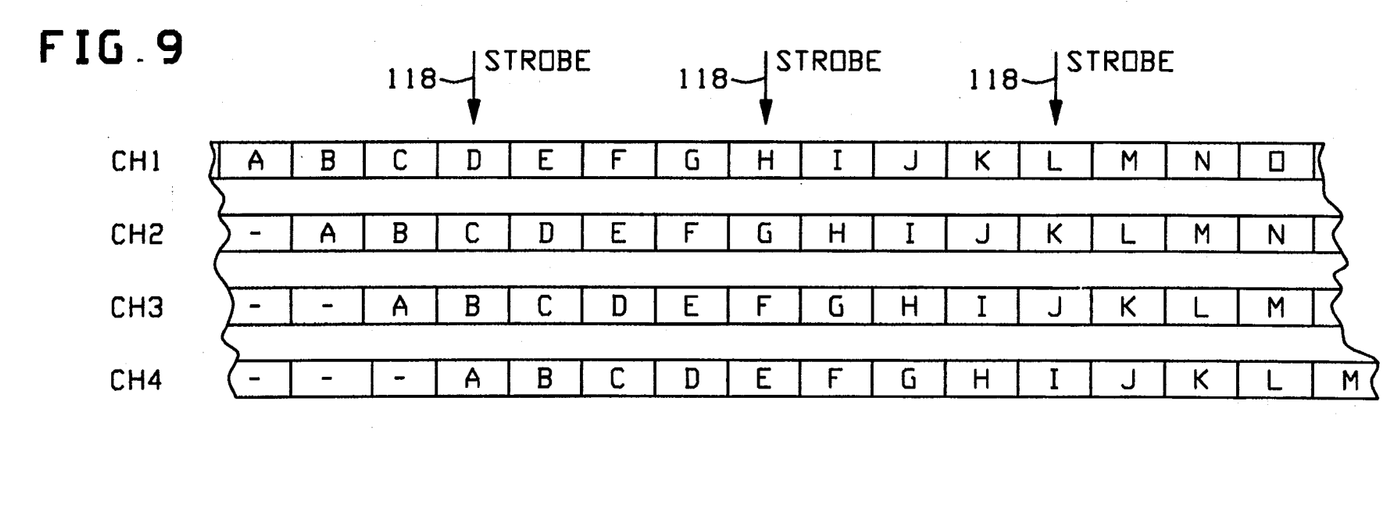
FIG. 9 is a schematic diagram showing four parallel channels of chip data being processed in a series to parallel converter.

Refer now to FIG. 9 showing a schematic drawing of four parallels channels of chip data being processed in parallel format such as occurs in branches 33A to 33D (channels 1 to 4). In the diagram shown, the data in channel 1 is left most in the diagram and is delayed the least whereas channels 2 to 4 are successively delayed 1 to 3 chip times ($\Delta T_c$). When the D cell of channel 1 occurs, it is aligned in time with the C to A cells of channels 2 to 4. When all four channels are strobed simultaneously by strobe 118 (at cells D to A) all four cells A to D will appear as parallel outputs from their respective channels, thus, effecting a series to parallel conversion of the signals on line 28 as explained with reference to FIG. 4. Every symbol time $T_s$ a strobe signal will effectively access four (N) parallel channels of data having a data rate reduced by a factor of N, the number of channels employed.

Figure 10:
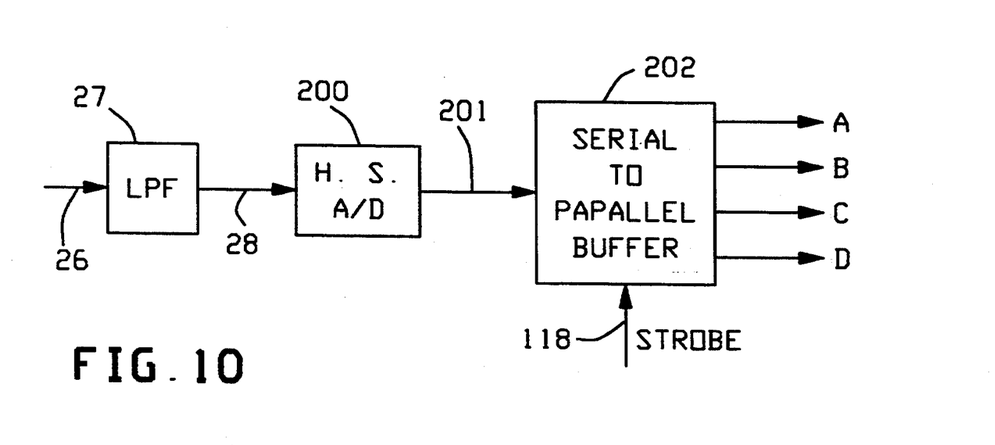
FIG. 10 is a schematic block diagram used to explain different series to parallel converters.

Refer now to FIG. 10 showing a modified series to parallel converter employing a high speed analog to digital converter 200. Such high speed converters are available which will produce a high speed serial digital output on bus 201 that is easily converted from serial to parallel format in buffer 202. The parallel outputs on line A to D from buffer 202 are strobed out in symbol time $T_s$ as explained hereinbefore. Other forms of well known high speed components can be employed to produce parallel channel outputs A to D as used in the present application.

Figure 11:
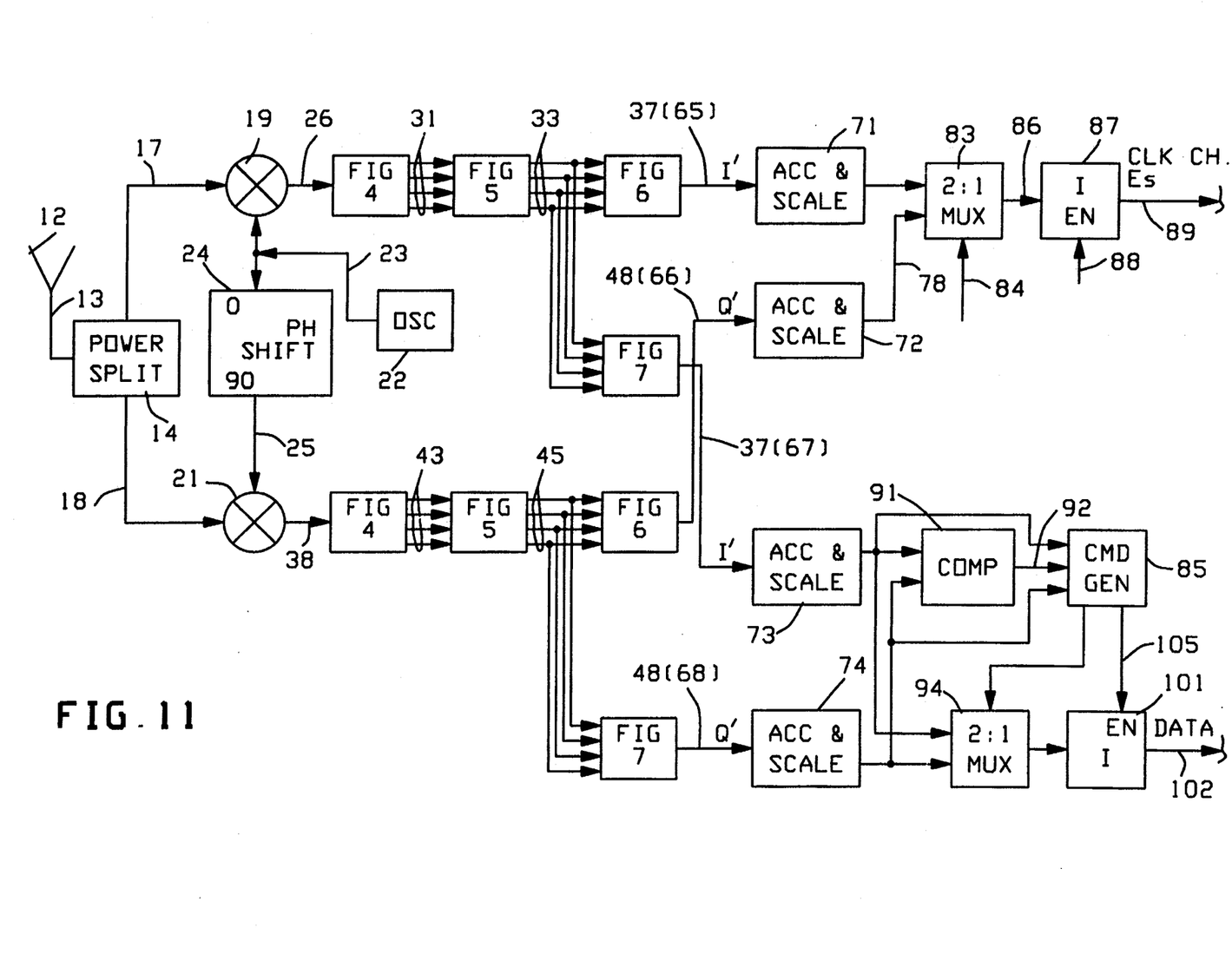
FIG. 11 is a composite schematic block diagram showing a preferred embodiment demodulator employing parallel processing channels to facilitate an increase in chipping rates.

Refer now to FIG. 11 showing a composite schematic block diagram of the present invention demodulator employing parallel processing channels which facilitate an increase in chipping rates. The numerals and Figures employed hereinbefore to explain the operation of structures and components are employed in FIG. 11 to illustrate the compatibility with the prior art digital demodulator and the modifications and enhancements provided by the parallel channels shown in FIGS. 4 to 7 herein. Thus, the high speed analog signals received at antenna are reduced by a factor of N in FIG. 4 and processed at the lower rate through the remainder of circuitry shown to recovery the code clock and the data.

Having explained a preferred embodiment structure employing two digital phase shifters in FIGS. 6 and 7 and a preferred series to parallel converter, it will be understood that the output of the analog low pass filter 27 and 39 are preferably converted to parallel digital format and reconverted to serial digital format at the output of FIGS. 6 and 7 using a minimum of hardware to reduce size and cost while providing a high speed digital demodulator using components of lower speed in parallel processing channels. A feature of the present invention is that all digital circuits shown and described herein are easily implemented on a single semiconductor chip, thus, replacing larger, more expensive and complex analog circuits used heretofore.

What is claimed is:

1. A high chipping rate digital demodulator circuit of the type used for processing real (Q) channel and imaginary (I) channel direct sequence spread spectrum signals generated in an analog front end of a digital communications receiver, comprising:

plural analog to digital converter means coupled to each said (I) channel and to each said (Q) channel and having a plurality of parallel output branches, each said branch providing a portion of a larger signal sample separate in time from other signal positions and collectively defining a digital signal sample of the received analog signal, digital filter means having a plurality of individual variable rate filters, one coupled in each said branch of the output of said analog to digital converter means, digital demodulator means in each said branch comprising parallel to series early-late error detector means and parallel to series data signal detector means, both said detector means being coupled in a parallel branch to the outputs of said digital filter means, PN generator means for producing a plurality of PN generated codes separated in time from each other and coinciding in time with said signal portions being processed in said branches for simultaneously demodulating the individual signal portions in said branches, both said parallel to series detector means each comprising summing means for converting said individual parallel demodulated signal portions into real (Q) and imaginary (I) digital signal samples of the received analog signals at the clock rate of the branches, and said digital demodulator means further comprising a clock error processing channel and a data signal/phase error processing channel coupled to the output of said summing means for providing clock code error signals and data signals from said received analog signals, whereby the clock rate in said parallel branches and said error processing channels is effectively reduced by the ratio of the number of branches so that the system chipping rate of the analog signals may exceed the operational speed of the digital components in the parallel branches.

2. A high chipping rate digital demodulator circuit set forth in claim 1 wherein said clock error processing channel comprises a digital phase shifter.

3. A high chipping rate digital demodulator circuit as set forth in claim 2 wherein said data signal/phase error processing channel comprises a digital phase shifter.

4. A high chipping rate digital demodulator circuit as set forth in claim 1 wherein said analog to digital converter means comprises a high speed analog to digital converter coupled to a serial in to parallel out buffer.

5. A high chipping rate digital demodulator circuit as set forth in claim 1 wherein the branch clock rate in said branches and said digital demodulator is reduced from the received system chipping rate by a ratio number N equal to the number of branches.

6. A high chipping rate digital demodulator circuit as set forth in claim 1 wherein said analog to digital converter means comprises individual low chipping rate analog to digital converters in each of said parallel output branches of each said channel.

7. A high chipping rate digital demodulator circuit as set forth in claim 6 wherein said analog to digital converter means comprises means for delaying the inputs to said converters in said branches to provide simultaneous outputs.

8. A high chipping rate digital demodulator circuit as set forth in claim 7 wherein each said individual analog to digital converter is provided with a strobe enable input for producing simultaneous outputs from said individual analog to digital converters.

9. A high chipping rate digital demodulator circuit as set forth in claim 6 wherein said digital filter means comprises a plurality of finite impulse response (FIR) filters, one in each branch coupled to the output of an individual analog to digital converter.

10. A high chipping rate digital demodulator circuit as set forth in claim 1 wherein said FIR filters each comprised a mixer having an output coupled to a summing circuit.

11. A high chipping rate digital demodulator circuit of the type used for processing real (Q) channel and imaginary (I) channel direct sequence spread spectrum signals generated in an analog front end of a digital communications receiver, comprising:

analog to digital converter means coupled to each said (I) channel and to each said (Q) channel and having a plurality of parallel output branches, each said branch providing a portion of a larger signal sample separate in time from other signal positions and collectively defining a digital signal sample of the received analog signal, digital filter means having a plurality of individual variable rate filters, one coupled in each said branch of the output of said analog to digital converter means, digital demodulator means in each said branch comprising parallel to series early-late error detector means and parallel to series data signal detector means, said early-late error detector means comprising a summing circuit having an output coupled to a mixer, both said detector means being coupled in a parallel branch to the outputs of said digital filter means, PN generator means for producing a plurality of PN generated codes separated in time from each other and coinciding in time with said signal portions being processed in said branches for simultaneously demodulating the individual signal portions in said branches, said parallel to series detector means each comprising summing means for converting said individual parallel demodulated signal portions into real (Q) and imaginary (I) digital signal samples of the received analog signals at the clock rate of the branches, and said digital demodulator means further comprising a clock error processing channel and a data signal/phase error processing channel coupled to the output of said summing means for providing clock code error signals and data signals from said received analog signals, whereby the clock rate in said parallel branches and said error processing channels is effectively reduced by the ratio of the number of branches so that the system chipping rate of the analog signals may exceed the operational speed of the digital components in the parallel branches.

12. A high chipping rate digital demodulator circuit as set forth in claim 11 wherein each said mixer in each branch is provided with a second input comprising one of said plurality of PN generated codes for simultaneously demodulating the individual signal portions in said branches.

13. A high chipping rate digital demodulator circuit as set forth in claim 12 wherein said early-late detector means further comprises a second summing circuit coupled to the output of said mixer for providing a combined output signal at the same clock rate as said parallel branches.

14. The method of reducing the effective chipping rate in a digital demodulator of a digital communication receiver, comprising the steps of:

receiving an analog high chipping rate spread spectrum signal, providing said high chipping rate spread spectrum signal in a plurality of N parallel branches, delaying said high chipping rate spread spectrum signal in said branches by one chip time relative to each other, converting said delayed signals in said branches from high speed analog signals to lower speed digital format to provide lower speed parallel portions of said digital samples, processing said lower speed parallel portions of said samples in a plurality of digital demodulators at the lower speed reduced chipping rate, and then recombining said processed digital portions at the output of said plural digital demodulators to provide digital data signals and digital error signals at said lower speed reduced chipping rate.

* * * * *